May 30, 1967  L. A. HARRAH  3,321,913
SELF-ADJUSTING CLUTCH SLAVE CYLINDER
Filed Oct. 14, 1965

INVENTOR
LEON A. HARRAH

BY Aughrue, Rothwell, Mion, Zinn & Macpeak
ATTORNEYS

United States Patent Office 3,321,913
Patented May 30, 1967

3,321,913
SELF-ADJUSTING CLUTCH SLAVE CYLINDER
Leon A. Harrah, 814 Orchard St.,
Charleston, W. Va. 25302
Filed Oct. 14, 1965, Ser. No. 495,949
6 Claims. (Cl. 60—54.6)

ABSTRACT OF THE DISCLOSURE

A self-adjusting slave cylinder including relatively movable primary and secondary pistons forming between them and the cylinder primary and secondary fluid working chambers to automatically maintain a particular clearance between a friction device and a friction device actuating linkage.

---

In most automotive or vehicular applications, where a friction-type clutch is controlled through a hydraulic control system, the hydraulic control system principally comprises a clutch pedal, master cylinder and clutch slave cylinder which usually is connected to the clutch through a clutch release rod. Upon depressing the clutch pedal, fluid is discharged under pressure from the master cylinder to the clutch slave cylinder which, in turn, actuates the clutch by moving a clutch release rod which separates the clutch's friction elements as is known in the art.

This invention is particularly adapted to be used with those friction clutches that are spring-loaded where spring means normally bias friction elements into clutch engagement and where spring means must be overcome to effect clutch disengagement.

As clutch wear occurs, a clearance in a clutch actuating linkage, normally provided between a clutch release rod and the clutch, is decreased, and if not periodically adjusted, the clearance eventually reaches a point where the release rod cannot fully engage the clutch and clutch slippage or burn out occurs. It has, therefore, been the practice to compensate for clutch wear and/or otherwise adjust clutch linkage clearance by providing a mechanical adjustment on the clutch release rod to increase or decrease its length. These adjustments are often inaccessible and if not periodically checked, costly damage, road failures, and down time result.

Further, it is desirable in clutch linkages of the hydraulic type to keep the clutch linkage clearance at a minimum and also keep the clearance constant such that upon each depression of the clutch pedal, the clutch will engage or disengage at a fixed point along its stroke enabling the operator to develop a "feel" for the clutch.

Therefore, it is a primary object of this invention to provide a fluid actuator for friction devices incorporating novel slack adjusting means to automatically compensate for end play of a friction device in either direction, by wear or by thermal swelling, and in doing so, to maintain a particular finite working clearance in a friction device's actuating linkage.

Another object of this invention is to provide an improved clutch slave cylinder for a clutch hydraulic control system with means to maintain a limited fixed clearance in the actuating linkage and with means to relate the fixed clearance to a fixed amount of free travel in a clutch operating lever.

Still another object of this invention is to provide a fluid actuator for a friction device combined with friction device compensating means which is rugged, reliable, entirely automatic in its use, and relatively inexpensive to manufacture.

The foregoing and other objects, features and advantages of the invention will be apparent from the following more particular description of a preferred embodiment of the invention, as illustrated in the accompanying drawing.

The improved self-adjusting slave cylinder generally comprises a bore in which is disposed a primary and secondary piston. The primary piston forms a primary fluid working chamber between the piston and one end wall of the bore, and the secondary piston rides within a longitudinal bore in the primary piston and forms a secondary fluid working chamber therewith.

In a preferred use, the clutch slave cylinder is part of a hydraulic control system for a spring-loaded friction clutch. The cylinder is linked to a clutch through a clutch release rod which mates with the secondary piston, the piston being suitably formed.

In operation, when the clutch is to be disengaged and a clutch pedal is depressed, fluid under pressure from a clutch master cylinder enters the primary working chamber of the clutch slave cylinder and moves the primary piston until the piston encounters a stop ring positioned near the opened end of the cylinder's bore. During this portion of the clutch pedal travel, in which the pedal displaces fluid from the master cylinder to drive the primary piston the length of its stroke, the clutch linkage has undergone "free" travel. When the primary piston is stopped, and as the clutch pedal is depressed further, fluid enters the secondary fluid working chamber through a check valve and moves the secondary piston and clutch release rod to actuate and disengage the clutch.

When the clutch is to be engaged and the clutch pedal is released, fluid pressure is relieved to the slave cylinder and clutch spring pressure moves the secondary piston, through the clutch release rod, in a return stroke forcing fluid out of the secondary chamber through a port controlled by a pressure relief valve. After the clutch is fully engaged, the relief valve closes, trapping the remaining fluid. At this time, the clutch linkage is at zero clearance. As the pressure in the primary chamber depletes further, a retraction spring returns the primary piston to its initial position.

Thus, it can be seen that when the clutch is to be actuated or disengaged again, and after the primary piston has completed its stroke, the clutch linkage clearance will be again zero, due to the residual fluid within the secondary chamber. Consequently, the clutch pedal will actuate the clutch immediately as soon as the fixed "free" travel of its stroke is completed. Through this operation, the improved clutch slave cylinder adjusts or maintains a fixed clutch linkage by the amount of residual fluid entrapped within the secondary chamber upon each actuation of the clutch; at the same time providing a fixed amount of "free" clutch linkage travel which is in direct proportion to the stroke of the primary piston.

A more detailed description follows in which the construction, operational features, and other objects of the invention will be made clearer.

Figure 1:
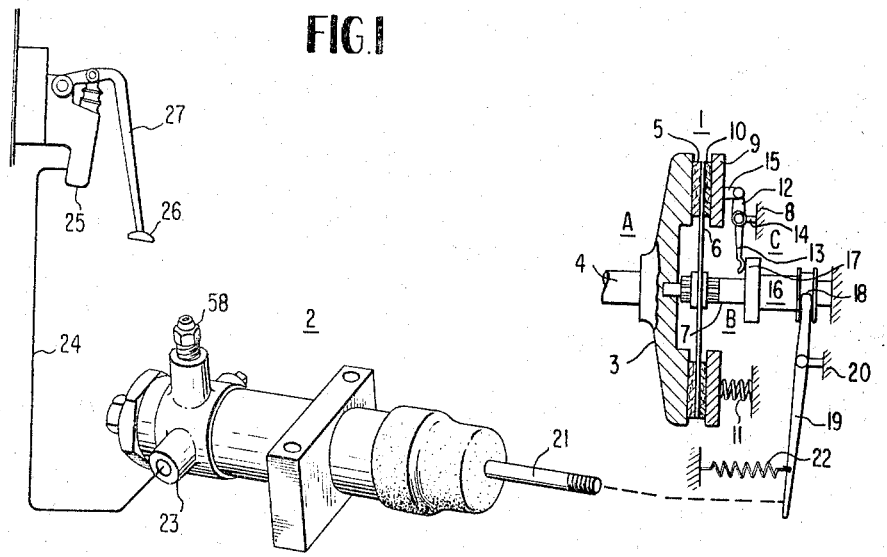
FIGURE 1 is a schematic view of a preferred embodiment of the present invention in which the self-adjusting slave cylinder is part of a hydraulic control system for a spring-loaded friction clutch.

Referring to the drawing, FIGURE 1 generally shows a hydraulic control system for a friction clutch 1 in which my self-adjusting clutch slave cylinder 2 is particularly adapted to form a component part.

Although not part of my invention, I will briefly discuss the elements and functions of the clutch 1 as it will enable one skilled in the art to better understand the adaptability of my invention to actuate such a clutch or friction device.

The clutch 1 is of the conventional spring-loaded type broadly comprising a drive assembly A, driven assembly B and an operating assembly C. The drive assembly A consists of a flywheel 3 that is keyed to an engine crankshaft 4 and has an attached annular friction surface 5. The driven assembly B consists of a friction disc 6 splined to a transmission shaft 7. The operating assembly consists of a bearing plate 8, only partially shown; a pressure plate 9 with an attached annular friction surface 10; clutch springs 11, only one shown, located circumferentially between said plates 8, 9; a release linkage 12, only one shown, located circumferentially between said plates 8, 9 and intermittent said clutch springs 11; said release linkage 12 having a lever 13 pivoted about an arm 14, said lever 13 being pivotally connected to pressure plate 9 through arm 15; a sleeve 16 slidably mounted on transmission shaft 7 having a shoulder 17 and an annular depression 18; a lever 19 which is pivotally mounted against a bearing surface 20 and is formed at one end to mate with the depression 18 in sleeve 16.

Normally, as shown, the clutch springs 11, bear against the bearing plate 8 and bias the friction surfaces 5, 6 and 10 together to form a solid coupling between the drive assembly A and the driven assembly B. When the clutch 1 is to be disengaged or actuated, the operator lever 19 is rotated counterclockwise which moves the sleeve 16 to the left, whereby the shoulder 17 comes in contact with the lever 13, which in pivoting about arm 14 pulls the pressure plate 9 to the right and compresses clutch springs 11, thereby separating the friction surfaces 5, 6 and 10. When the operating lever 19 is released, the clutch springs 11 force the friction surfaces together, and the clutch is once again engaged. As in previous clutch control systems which utilize a clutch slave cylinder, my improved self-adjusting clutch slave cylinder 2 is linked to the clutch operating lever 19 through a clutch release rod 21. A retraction spring means 22 is attached to the lower portion of the operating lever 19 to bias the clutch release rod against the clutch cylinder 2. Further, as in previous systems, my clutch slave cylinder 2 has fluid access ports 23 which are in communication through a hydraulic linkage 24 with a clutch master cylinder 25. A clutch pedal 26 and lever 27 are linked to the master cylinder in a conventional manner such that as the pedal 26 is depressed, fluid will be ejected under pressure from the master cylinder 25.

The clutch 1 and master cylinder 25 in combination with the clutch pedal 26 and lever 27 are all known in the art and constitute no part of my invention. Further, it is known in the art to utilize a clutch slave cylinder as a component with these aforementioned features in a clutch hydraulic control system. My invention is an improved self-adjusting clutch slave cylinder, which will now be described.

Figure 2:
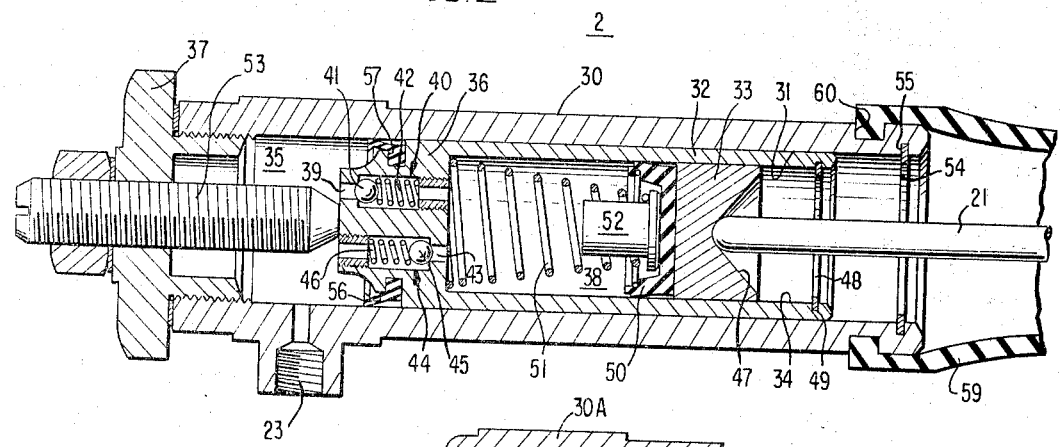
FIGURE 2 is a cross-sectional view of the clutch slave cylinder shown in FIGURE 1.

My self-adjusting clutch slave cylinder 2 is best seen in a cross-sectional view shown in FIGURE 2. The cylinder 2, shown in an inoperative position, consists of a casing 30 having a bore 31 in which is disposed a primary piston 32 and a secondary piston 33, the secondary piston 33 is carried within a longitudinal bore 34 of the primary piston 32. A primary fluid chamber 35 with fluid access ports 23 (only one is shown) is formed between an anterior head 36 of the primary piston 32 and a threaded plug 37, which closes off one end of the bore 31. A secondary fluid chamber 38 is formed in the longitudinal bore 34 of the primary piston 32 between an anterior end of the secondary piston 33 and the head 36 of the primary piston 32. Fluid enters the secondary chamber 38 from the primary chamber 35 through an inlet port 39 and check valve 40. The check valve 40 comprises a ball 41 which is biased and normally sealed against port 39 by spring 42. The valve 39 permits only unidirectional flow into the secondary chamber 38 and only when the liquid pressure in the primary chamber is sufficient to move the ball against spring 42 and any fluid pressure that would be acting on the ball in secondary chamber 38. Fluid exits from the secondary chamber through an outlet port 43 only when the fluid has a pressure to overcome a spring-loaded pressure relief valve 44. The pressure relief valve 44 comprises a ball 45 which is biased and normally sealed against outlet port 43 by springs 46. The valve 44 permits only unidirectional flow from the secondary chamber 38 and only when the pressure in the secondary chamber 38 is sufficient to overcome spring 45 and any fluid pressure acting on the ball in primary chamber 35. The check valve spring 42 is of such strength that it only provides sufficient force to bias the ball 41 against the port 39, whereas the pressure relief valve spring 46 is of a calibrated strength to permit fluid flow through port 43 only when a particular differential working pressure is reached between secondary chamber 34 and primary chamber 35.

Figure 3:
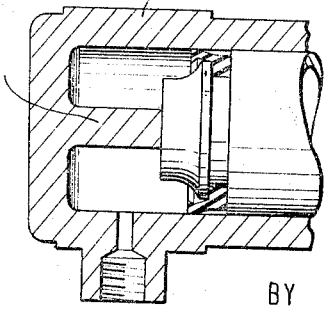
FIGURE 3 is a fragmentary view of an alternative form of one end of the clutch slave casing shown in FIGURE 2.

The secondary piston 33, which has an annular recess 47 formed at its exterior end to mate with a clutch release rod 21, is contained within the longitudinal bore 34 by a stop ring 48 positioned in an annular recess 49 formed near the open end of the longitudinal bore 34. A cup-type piston seal 50 which forms a fluid seal for secondary chamber 38 is retained against the anterior end of the secondary piston 33 by a spring 51 through a spring retainer 52. The spring 50 also biases the secondary piston 33 against the clutch release rod 21. An adjustable stop 53 regulates a stroke length of the primary piston 32 which is free to travel between the adjustable stop 53 and a stop ring 54 positioned in an annular recess 55 of the bore 31. As shown in a modification, FIGURE 3, the clutch slave cylinder could be simplified to reduce manufacturing costs by having a casing 30A formed integrally with a calibrated permanent stop 53A in lieu af threaded plug 37 and adjustable stop 53A. In this modification, a variable means still could be provided for the piston stroke of primary piston 32 by forming stop 54 with an integral sleeve (not shown) which would be adjacent and concentric to bore 31. A stop with a particular sleeve length would be inserted for a corresponding particular piston stroke desired for primary piston 32. The stroke length of the primary piston 32, which is sealed against bore 31 by seal 56 positioned in an annular recess 57, is in direct proportion to the amount of free travel in the clutch linkage. An air bleed means 58, shown in FIGURE 1, is provided for the primary chamber 35, and a cover 59 contained by an annular outer recess 60 on the casing 30 is provided to prevent foreign matter from entering the open end of the slave cylinder.

The self-adjusting cylinder will now be described in operation as a component part of the hydraulic control system shown in FIGURE 1. It is to be understood that the threaded end of clutch release rod 21 is mechanically connected to the clutch operating lever 19 in approximately the location shown by the dash lines, and it is to be further understood that the retraction spring 22 biases the release rod 21 against the clutch slave cylinder through secondary piston 33. When the clutch slave cylinder 2 is initially installed in a hydraulic control system, the secondary piston 33 is linked to the clutch release rod 21 in approximately the position shown in FIGURE 2 such that there is ample clearance at all times to prevent the secondary piston 33 from bottoming on stop ring 48 and damaging the cylinder. Further, the cylinder, as shown, has been purged and the working chambers 35, 38 are filled with hydraulic fluid.

In operation, when the clutch pedal 26 is depressed, the clutch lever 27 operates the master cylinder 25 which ejects fluid under pressure to the primary chamber 35 via the hydraulic linkage 24 and fluid access port 23. The fluid, in entering the primary chamber 35, overcomes retraction spring 22 and forces the primary piston 32 to the right moving the secondary piston and column of fluid and secondary chamber 38 in unison until the piston abuts against the stop ring 54. Through the movement of the primary piston 32, since no actuation of the clutch has occurred, the clutch pedal 25 has undergone a fixed amount of free travel which is in direct proportion to the stroke length of the primary piston. The stroke length of piston 32 also correspondis to a fixed clearance or free travel in the clutch actuating linkage.

As the clutch pedal is depressed further, fluid enters the secondary chamber 38 through port 39 forcing the secondary piston 33 and clutch release rod 21 to the right, which in turn rotates the clutch operating lever 19. The operating lever 19 in being rotated disengages the clutch 1 through the clutch operating assembly G as previously mentioned.

When the clutch is to be engaged, the clutch pedal is released. Fluid pressure is relieved within the master cylinder 25 and resultingly in primary chamber 35. This lowering of fluid pressure within the primary chamber 35 enables the fluid pressure in the secondary chamber 38, which is created by the compression of the clutch springs 11, to overcome the pressure relief valve 44 and fluid is consequently discharged from the secondary chamber 38 through the outlet port 45 into the primary chamber 35 and out the fluid access port 23. As the fluid leaves secondary chamber 38, the secondary piston 33 is moved to the left by clutch springs 11 until said clutch springs are fully retracted and the clutch is engaged. The pressure exerted by clutch springs 11 is simultaneously relieved in the secondary chamber 38 which closes the pressure relief valve 44 trapping the remaining fluid within the secondary chamber 38. Further, at this instant, the clutch linkage clearance is zero. Note that so far the primary piston has not moved. Although the pressure in the secondary chamber 38 is greater than the fluid pressure in the primary chamber 35 during the period of time when the pressure relief valve 44 is open, the differential fluid working area on the primary piston is such that the primary piston is biased to the right. When fluid pressure in the primary chamber 35 depletes further, then the retraction spring 22 moves the primary piston to the left, in unison with the secondary piston and the residual entrapped column of the noncompressible liquid in the secondary chamber 38 until the primary piston 32 abuts against stop member 53.

When the clutch is to be engaged again, and the clutch pedal is depressed, the primary piston will complete its stroke as before, at which time clutch clearance in the actuating linkage will then be zero due to the residual fluid in chamber 38. (Assuming that the operative position for clutch engagement of the clutch release lever 19 has no changed.) After the primary piston is stopped and the clutch pedal is depressed further, as before, fluid enters the secondary chamber 38 and actuates or disengages the clutch 1.

Upon disengaging the clutch, still as before, after the clutch springs 11 are fully retracted (the clutch disengaged), and the pressure relief valve 44 is closed, the clutch clearance and the actuating linkage will again be zero by the enclosed residual fluid in secondary chamber 38. The primary piston 32 afterwards is returned, carrying the secondary piston and residual fluid 38, to its inoperative position by retraction springs 22.

As wear occurs on the friction surfaces 5, 10 and 6 of clutch 2, it can easily be seen that clutch springs 11 will move the pressure plate 9 correspondingly to the left. The operative position of the clutch operating lever 19 will correspondingly be rotated clockwise which will move clutch release rod 21 toward the left and decrease the length of the clutch actuating linkage. The self-adjusting clutch slave cylinder easily compensates for this wear simply by the capability of retaining less fluid within the secondary chamber 38. The amount of fluid retained in the secondary chamber is due solely on the final return position of the secondary piston 33 which corresponds to the exact moment the clutch springs 11 engage the clutch. Therefore, as wear occurs, and as the final return position of the secondary piston is progressively moved to the left, the column of liquid retained in the secondary chamber 38 grows correspondingly smaller, in effect decreasing the length of the linkage between the clutch slave cylinder 2 and operating lever 19.

Similarly, should clutch thermal swelling occur, and the final position of the secondary piston be moved correspondingly to the right, the column of fluid retained within the secondary chamber 38 will be correspondingly increased, in effect increasing the actuating linkage between the clutch slave cylinder 2 and operating lever 19.

Therefore, it can be seen that upon each operation of clutch actuation, the clutch slave cylinder, through the amount of residual fluid in the secondary chamber, compensates for either wear or thermal expansion of the clutch, and maintains a fixed clutch linkage which provides a fixed portion of free travel for each stroke of the clutch pedal.

While the invention has been particularly shown and described with reference to a preferred embodiment thereof, it will be understood by those skilled in the art that various changes in form and details may be made therein without departing from the spirit and scope of the invention.

What is claimed is:

1. A fluid actuator with slack adjusting means comprising: a casing having a first bore closed at a first end and opened at a second end. a first piston carried by said bore forming a first working chamber therebetween, a fluid access port to said first chamber, said first piston having a longitudinal second bore closed at one end, a second piston carried in said longitudinal second bore of said first piston and forming a second working chamber therein, a fluid inlet in said one end for said second chamber, a check valve within said fluid inlet permitting only unidirectional flow toward said second chamber from said first chamber, a fluid outlet in said one end for said second chamber, a pressure relief valve within said fluid outlet permitting only unidirectional flow toward said first chamber from said second chamber and only when a predetermined differential pressure is reached between said chambers.

2. A fluid actuator claimed in claim 1 having a stop member located on said closed first end of said first bore, a second stop member adjacent an open end of said first bore, whereby said stop members define the stroke limits of said first piston.

3. A fluid actuator claimed in claim 2 in which one of said stop members is adjustable, whereby said stroke limits of said primary piston may be varied.

4. In a fluid actuator with slack adjusting means for use in a hydraulic control system for a friction device, said actuator comprising: a casing having a bore closed at a first end and open at a second end, a stop member located on said first end, a second stop member located adjacent said second end of said bore, a first piston, said stop members defining stroke limits for said first piston, said first piston carried by said first bore forming a first working chamber therein, a fluid access port to said first chamber, said first piston having a longitudinal second bore closed at one end, a second piston, said second piston carried by said longitudinal second bore forming a second working chamber therein, a fluid inlet in said one end for said second chamber, a check valve within said fluid inlet permitting only unidirectional flow toward said second chamber from said first chamber, a fluid outlet in said one end for said second chamber, a pressure relief valve within said fluid outlet permitting only unidirectional flow toward said first chamber from said second chamber and only when a predetermined differential working pressure is reached between said chambers.

5. A fluid actuator to be used in an actuating linkage for a friction device of the type having return means, said fluid actuator having means to compensate for wear or expansion of said friction device to maintain a fixed working clearance in said actuating linkage, said fluid actuator comprising: a casing having a bore closed at one end, a first piston carried by said bore and forming a first working chamber therein, two stop members within said bore, a fluid access port to said first chamber, said stop members defining the stroke limits of said first piston, said first piston having a longitudinal bore closed at one end, a second piston carried by said first piston bore and forming a second working chamber therein, valved fluid communicating means carried by said first piston end between said chambers, whereby, after said first piston completes a piston stroke between said stop limits, fluid enters said second chamber through said valved communicating means and moves said second piston to actuate said friction device, and whereby after the friction device is deactuated said return means move the secondary piston in a return stroke discharging fluid through said valved fluid access port until said friction device is engaged at which time said valved fluid communicating means closes, trapping residual fluid within said second chamber, and further whereby the residual fluid within the secondary chamber, after each return stroke of the secondary piston, adjusts for any change of clearance between said friction device and said fluid actuator with the stroke limits of said first piston defining the degree of said fixed working clearance in said actuating linkage.

6. A fluid actuator with slack adjusting means for a friction clutch, a hydraulic control system including a hydraulic pressure device operated by a clutch pedal, said friction clutch being of the type having return means and connected to said actuator through a thrust member, said fluid actuator comprising: a casing having a bore which is closed at one end, a stop member located on said end, a second stop member adjacent an open second end of said bore, a first piston, said first piston carried by said bore forming a first working chamber therewith, said stop members defining stroke limits for said first piston, a fluid access port for said first chamber communicating with said pressure device, said first piston having a longitudinal bore closed at one end, a second piston carried by said longitudinal second bore forming a second working chamber therewith, said second piston having an annular recess on one end formed to mate with said thrust member, fluid communicating means carried by said first piston between said working chambers, valve means in said communicating means permitting relative freedom of flow toward said second chamber from said first chamber but permitting fluid flow only toward said first chamber from said second chamber when a predetermined differential working pressure is reached between said chambers, whereby when fluid pressure is distributed to said primary chamber by said pressure device and when said first piston completes a piston stroke between said stop limits, fluid enters said second chamber through said communicating means and moves said second piston to actuate said friction clutch through said thrust member, and, after said friction device is deactuated, said return means moves said secondary piston in a return stroke overcoming said valved means in said communicating means discharging fluid through said outlet port until said return means is inoperative, whereupon, said valves means closes, trapping residual fluid within said second chamber, said residual fluid after completing said return stroke of said second piston adjusts and maintains a particular fixed clearance between said fluid actuator and said friction clutch, said fixed clearance being defined by said first piston stroke limits.

References Cited

UNITED STATES PATENTS 2,048,472   7/1936   Sanford _____ 60—54.65 X

MARTIN P. SCHWADRON, *Primary Examiner.*

ROBERT R. BUNEVICH, *Examiner.*